United States Patent Office 2,945,830
Patented July 19, 1960

2,945,830

CATALYST FOR THE PREPARATION OF IMPROVED ALKYD RESINS

William M. Kraft, Verona, N.J., assignor to Heyden Newport Chemical Corporation, a corporation of Delaware No Drawing. Filed Sept. 13, 1955, Ser. No. 534,145

16 Claims. (Cl. 260—22)

The present invention relates to the production of pentaerythritol ester reaction products including pentaerythritol alkyd resins having novel and desirable characteristics. While the present invention will be described more particularly in connection with the production of alkyd resins its principles are applicable to the production of pentaerythritol ester-ethers which in addition to being useful in the production of alkyd resins are also useful as intermediates in preparing modified drying oils, paints and other products.

Alkyd resins are produced by reacting a polyhydric alcohol and a polycarboxylic acid. The alkyd resins may be modified with a monocarboxylic acid. While phthalic acid is a commonly used dicarboxylic acid and drying oil fatty acids are used extensively for modifying the alkyd resins, other polycarboxylic and monocarboxylic acids may be used. For example, the polycarboxylic acid may be maleic acid, fumaric acid, sebacic acid, terephthalic acid, isophthalic acid, tetrahydrophthalic acid or other aliphatic, aromatic or cyclic acid. Mixtures of such acids can be used and in general the anhydrides of the acids can be used in place of the acids. Accordingly, the term "acid" as used herein includes the anhydride unless clearly stated otherwise. A large variety of polyhydric alcohols are used in the production of alkyd resins and such alcohols include glycerin, pentaerythritol and dipentaerythritol. The particular acid or combination of acids as well as the particular alcohol or combination of alcohols depends upon the characteristics desired in the alkyd resin.

Highly satisfactory alkyd resins which are especially useful in preparing architectural finishes are the pentaerythritol and dipentaerythritol types of alkyds. The alkyd resins prepared with dipentaerythritol are, in general, superior to those prepared from pentaerythritol. For example, dipentaerythritol-phthalic acid resins form films which are harder and more resistant to water and alkali than similar films formed from pentaerythritol-phthalic acid resins. However, dipentaerythritol is produced commercially only as a by-product in the production of pentaerythritol. When acetaldehyde and formaldehyde are condensed in an aqueous medium containing an alkaline condensation catalyst to produce pentaerythritol commercially, a relatively small amount of the polyhydric product, for example, about 12%, is dipentaerythritol. This limits the production of dipentaerythritol and it is not always available for use either alone or with pentaerythritol to form alkyd resins.

It has been discovered that partially esterified pentaerythritol may be dehydrated in the presence of a cation exchange resin to form a pentaerythritol ester-ether having the characteristics similar to dipentaerythritol esters having the same degree of esterification. The esterification may precede dehydration or take place substantially simultaneously therewith. Apparently, the ester groups and particularly the ester groups of monocarboxylic acid direct or favor the formation of dipentaerythritol-like esters which are monoethers containing the ether linkage, —CH$_2$—O—CH$_2$. Where esterification precedes dehydration the pentaerythritol may be esterified with monocarboxylic acid alone or with both monocarboxylic and dicarboxylic acids. In either case, the total esterification shall be less than that required to esterify all of the hydroxyl groups in the pentaerythritol. The partially esterified pentatrythritol must have hydroxyl groups available for the dehydration reaction.

Alternatively, the pentaerythritol may be mixed with monocarboxylic acid and heated in the presence of the catalyst so that esterification and dehydration apparently take place at the same time.

Any of the monocarboxylic acids commonly used in the production of alkyd resins may be used to partially esterify the pentaerythritol. For example aliphatic and aromatic acids such as the higher fatty acids containing 6–18 carbon atoms, benzoic acid, or mixtures thereof, may be used. Drying oil and semi-drying oil acids as well as lauric and caproic acids may be used. The degree of esterification of the pentaerythritol with monocarboxylic acid depends to a certain extent upon whether or not the pentaerythritol is also partially esterified with dicarboxylic acid prior to dehydration. Where only monocarboxylic acids are used for esterification prior to or at the time of dehydration then the degree of esterification may range from one to three moles of monocarboxylic acid per mole of pentaerythritol. Under these conditions about one mole of acid is required to obtain the desired results while esterification by more than three moles of acid unduly reduces the average hydroxyl content and also the formation of ether linkages upon dehydration. The pentaerythritol is preferably esterified with about one to two moles of monocarboxylic acid per mole of pentaerythritol. Excellent results have been obtained when using 1.3 moles of acid per mole of pentaerythritol. The following equation illustrates the esterification reaction by a monocarboxylic acid which accompanies or precedes the dehydration reaction.

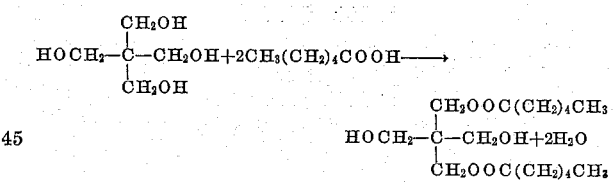

When the pentaerythritol is partially esterified with both monocarboxylic acid and dicarboxylic acid prior to dehydration to form a pre-alkyd resin the amount of pentaerythritol is in excess of the stoichiometric amount required by the total amount of acids to form a fully esterified pentaerythritol reaction product. In other words, the pentaerythritol ester is partially esterified and contains free hydroxyl groups available for dehydration. Where both types of acids are used to form the pre-alkyd then the amount of monocarboxylic acid is preferably about 1 to 2 moles per mole of pentaerythritol. Alternatively, the pentaerythritol may be completely esterified with monocarboxylic acid or with monocarboxylic and dicarboxylic acid and this fully esterified pentaerythritol reacted with an additional quantity of pentaerythritol to form partially esterified pentaerythritol by an "alcoholysis" type of reaction. The properties of the pentaerythritol reaction product or ether resulting from the dehydration reaction depend on the amount of water removed by dehydration. The removal of at least 0.4 mole of water per mole of pentaerythritol is desirable to obtain a noticeable improvement. If substantially more than 0.8 mole of water per mole of pentaerythritol is removed by dehydration the reaction proceeds very slowly and there is a tendency to produce insoluble by-products. Preferably 0.45–0.65 mole of water is removed by dehydration. In order to effect this amount of dehydration the partially esterified pentaerythritol must contain on the average a molal amount of hydroxyl groups which is on the average twice the molal amount of water removed by dehydration. For example, to effect the removal of 0.5 mole of water the partially esterified pentaerythritol must contain on the average one hydroxyl group which is available for dehydration. The following equation illustrates the dehydration of a pentaerythritol di-ester to form a dipentaerythritol tetra-ester.

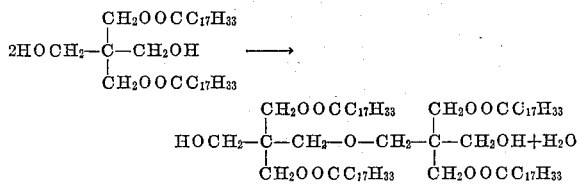

This equation illustrates the dehydration portion of the reaction to form a product containing an ether linkage. The above equation is merely to illustrate this point as somewhat differing, other products may be formed which are ethers of pentaerythritol esters.

It has been found that very light colored products can be formed by using as the dehydration catalyst a small catalytic amount of a cation exchange resin in the hydrogen cycle. Useful resins are the nuclear sulfonated polystyrene cation exchange resins which include nuclear sulfonated copolymer resins of styrene and divinyl benzene resins. The amount of resin used as a catalyst may vary from about 1 to 10 percent by weight of the pentaerythritol ester although larger or smaller amounts may be used. When a partial ester of pentaerythritol and only monocarboxylic acid is dehydrated, the resin catalyst may be separated from the dehydrated product by filtration or by any other suitable means. The recovered resin may be reused after being washed with an acid of the type used to put the resin in the hydrogen cycle or acidic condition. The following examples illustrate the present invention and all parts and percentages are by weight unless clearly stated differently.

EXAMPLE I

Pentaerythritol was partially esterified and dehydrated (etherified) by mixing 146 grams (1 mole) of technical grade pentaerythritol and 362 grams (1.3 moles) of soybean oil fatty acids with 10 grams of cation exchange resin in 30 ml. of xylene. The resin was a nuclear sulfonated copolymer of styrene and divinyl benzene available on the market as "Amberlite IR-120." The resin was in the hydrogen cycle. The mixture was heated at 220° C. until 35.8 grams (1.95 moles) of water had been removed from the reaction zone and collected in a condenser. The esterification reaction accounted for 1.3 moles of the water. The remainder, 0.65 mole of water, was water of dehydration. The reaction mixture was filtered to separate the particles of resin. The resin can be washed to remove any reaction mixture and the resin can be reused after washing with acid to put the resin in the hydrogen cycle.

The esterified pentaerythritol ether prepared as described above was mixed with 118 grams (0.8 mole) of phthalic anhydride and the mixture was heated at 220° C. until an alkyd resin was obtained having an acid number of less than 10. The properties of this alkyd resin were compared with a dipentaerythritol alkyd resin prepared with the same proportions of acids. In each instance, a thin film was formed by casting a xylene solution containing 70% alkyd resin onto a test tube. The film was air dried and then the test tube was immersed in 3% aqueous sodium hydroxide to determine the alkali resistance of the film by noting the time required to effect considerable attack and complete denuding (failure) of the film. A similar solution was cast in a film on flat glass to determine film hardness, color and viscosity. The comparative values are set forth in the following table:

Table

| Resin | Gardner Color | Gardner-Holdt Viscosity | Hardness, Glass=100 | | Alkali Resistance in Hours | |
|---|---|---|---|---|---|---|
| | | | 1 day | 7 days | Cons. Attack | Complete Denuding |
| Pentaerythritol of Example | 7 | Y | 6 | 24 | 5.5 | 43 |
| Dipentaerythritol Resin | 7 | Z-2 | 6 | 24 | 8 | 42 |

EXAMPLE II

A mixture comprising 47 grams (0.32 mole) phthalic anhydride, 148.5 grams (0.53 mole) of soybean oil fatty acids and 61 grams (0.45 mole) of pentaerythritol was heated at 230° C. for 3.5 hours to form partially esterified pentaerythritol reaction product (pre-alkyd resin) containing 53% excess pentaerythritol. This pre-alkyd was mixed with 5 grams of a cation exchange resin like that of Example I and heated until 3.7 mls. of water of dehydration had been removed. The properties of this alkyd resin were determined as described in Example I and the properties of this light colored resin are set forth in the following table:

Table

| Gardner Color | Gardner-Holdt Viscosity | Hardness, Glass=100 | | Alkali Resistance in Hours | |
|---|---|---|---|---|---|
| | | 1 Day | 7 Days | Cons. Attack | Complete Denuding |
| 8 | T± | 4 | 12 | 0.5 | 5.5 |

In the foregoing Example I a similar, esterified pentaerythritol-ether could have been prepared in two steps by first partially esterifying the pentaerythritol with the soybean oil fatty acids and thereafter mixing the partially esterified pentaerythritol with the cation exchange resin and heating to effect the removal of 0.65 mole of water of dehydration. This dehydrated product (ester-ether) can then be reacted with dicarboxylic acid to form an alkyd resin. Where a pre-alkyd resin is prepared as described in Example II prior to dehydration, the pre-alkyd may be dehydrated and thereafter reacted with additional fatty acid as well as additional phthalic acid depending upon the type of alkyd resin desired and the amount of acid used in forming the pre-alkyd resin.

The dicarboxylic acid reacted with the esterified pentaerythritol ether may be any of the dicarboxylic acids or their anhydrides customarily used in the production of alkyd resins. Where the final reaction involves the reaction of a pentaerythritol ester-ether with additional acid, hydroxyl groups must be available in the pentaerythritol ester-ether for reaction with the acid. The amount of esterification as well as the amount of ether linkages formed by dehydration are in all cases the average present per mole of pentaerythritol.

In accordance with the present invention and by the use of cation exchange resins in the hydrogen cycle, the dehydrated pentaerythritol ester is very light in color and when converted to other products such as alkyd resins the final product is characterized by properties better than those obtained with pentaerythritol and with characteristics comparable to those obtained by using dipentaerythritol.

I claim:
1. The process of producing reaction products of pentaerythritol comprising partially esterifying pentaerythritol with at least one mole of a monocarboxylic acid containing 6 to 18 carbon atoms per mole of pentaerythritol and heating and dehydrating the pentaerythritol ester in the presence of a catalytic amount of a nuclear sulfonated polystyrene cation exchange resin in the hydrogen cycle and removing from 0.4 to 0.8 mole of water of etherification per mole of pentaerythritol to form an esterified dipentaerythritol-containing pentaerythritol reaction product.

2. The process of producing reaction products of pentaerythritol comprising partially esterifying pentaerythritol with at least one mole of a monocarboxylic acid containing 6 to 18 carbon atoms per mole of pentaerythritol and heating and dehydrating the pentaerythritol ester in the presence of a catalytic amount of a nuclear sulfonated styrene-divinyl benzene copolymer cation exchange resin in the hydrogen cycle and removing from 0.45 to 0.65 mole of water of etherification per mole of pentaerythritol to form an esterified dipentaerythritol-containing pentaerythritol reaction product.

3. The process of producing esterified pentaerythritol ethers comprising heating a partial ester of pentaerythritol partially esterified with from one to three moles of a monocarboxylic acid containing 6 to 18 carbon atoms per mole of pentaerythritol and a catalytic amount of a nuclear sulfonated styrene-divinyl benzene copolymer cation exchange resin in the hydrogen cycle, thereby removing from 0.4 to 0.8 mole of water of etherification per mole of pentaerythritol to form an esterified dipentaerythritol-containing pentaerythritol reaction product.

4. The process of producing pentaerythritol reaction products comprising forming a mixture comprising pentaerythritol, dehydration catalyst and from 1 to 2 moles of a monocarboxylic acid per mole of pentaerythritol, said monocarboxylic acid being selected from the group consisting of fatty acids containing 6 to 18 carbon atoms, benzoic acid and mixtures thereof, and heating the mixture and esterifying the pentaerythritol with said monocarboxylic acid and substantially simultaneously dehydrating the pentaerythritol to form water and an esterified, dipentaerythritol-containing pentaerythritol reaction product, the amount of water formed including from 0.4 to 0.8 mole of water of etherification per mole of pentaerythritol plus the water formed by esterification, said dehydration catalyst being a nuclear sulfonated styrene-divinyl benzene copolymer cation exchange resin in the hydrogen cycle.

5. The process of producing pentaerythritol reaction products comprising forming a mixture comprising pentaerythritol, dehydration catalyst and from 1 to 2 moles of a monocarboxylic acid per mole of pentaerythritol, said monocarboxylic acid being selected from the group consisting of fatty acids containing 6 to 18 carbon atoms, benzoic acid and mixtures thereof, and heating the mixture and esterifying the pentaerythritol with said monocarboxylic acid and substantially simultaneously dehydrating the pentaerythritol to form water and an esterified, dipentaerythritol-containing pentaerythritol reaction product, the amount of water formed including from 0.45 to 0.65 mole of water of etherification per mole of pentaerythritol plus the water formed by esterification, said dehydration catalyst being a nuclear sulfonated styrene-divinyl benzene copolymer cation exchange resin in the hydrogen cycle.

6. The process of producing pentaerythritol reaction products comprising forming a mixture comprising pentaerythritol, dehydration catalyst and about 1.3 moles of a monocarboxylic acid per mole of pentaerythritol, said monocarboxylic acid being selected from the group consisting of fatty acids containing 6 to 18 carbon atoms, benzoic acid and mixtures thereof, and heating the mixture and esterifying the pentaerythritol with said monocarboxylic acid and substantially simultaneously dehydrating the pentaerythritol to form water and an esterified, dipentaerythritol-containing pentaerythritol reaction product, the amount of water formed including from 0.45 to 0.65 mole of water of etherification per mole of pentaerythritol plus the water formed by esterification, said dehydration catalyst being a nuclear sulfonated styrene-divinyl benzene copolymer cation exchange resin in the hydrogen cycle.

7. The process of producing pentaerythritol reaction products comprising partially esterifying pentaerythritol with from 1 to 2 moles of monocarboxylic acid per mole of pentaerythritol, said monocarboxylic acid containing 6 to 18 carbon atoms, and thereafter dehydrating the partially esterified pentaerythritol in the presence of a dehydration catalyst and removing from 0.4 to 0.8 mole of water of etherification per mole of pentaerythritol to form an esterified, dipentaerythritol-containing pentaerythritol reaction product, said dehydration catalyst being a nuclear sulfonated styrene-divinyl benzene copolymer cation exchange resin in the hydrogen cycle.

8. In the process of producing light colored alkyd resins, the steps comprising heating a mixture comprising pentaerythritol, 1 to 2 moles of siccative oil acids per mole of pentaerythritol and a catalytic amount of nuclear sulfonated styrene-divinyl copolymer cation exchange resin in the hydrogen cycle to esterify the pentaerythritol and to remove from 0.4 to 0.8 mole of water of etherification per mole of pentaerythritol, and thereafter heating the resulting partially esterified dipentaerythritol-containing pentaerythritol reaction product with a member selected from the group consisting of aliphatic dicarboxylic acids, aromatic dicarboxylic acids, cyclic dicarboxylic acids, and the anhydrides of said acids, said acid being present in an amount sufficient to react with substantially all of the hydroxyl groups of said partially esterified pentaerythritol reaction product thereby forming an alkyd resin.

9. In the process of producing light colored alkyd resins, the steps comprising heating a mixture comprising pentaerythritol, 1 to 2 moles of siccative oil acids per mole of pentaerythritol and a catalytic amount of nuclear sulfonated styrene-divinyl copolymer cation exchange resin in the hydrogen cycle to esterify the pentaerythritol and to remove from 0.45 to 0.65 mole of water of etherification per mole of pentaerythritol, and thereafter heating the resulting partially esterified dipentaerythritol-containing pentaerythritol reaction product with a member selected from the group consisting of aliphatic dicarboxylic acids, aromatic dicarboxylic acids, cyclic dicarboxylic acids, and the anhydrides of said acids, said acid being present in an amount sufficient to react with substantially all of the hydroxyl groups of said partially esterified pentaerythritol reaction product thereby forming an alkyd resin.

10. In the process of producing light colored alkyd resins, the steps comprising heating a mixture comprising pentaerythritol, about 1.3 moles of siccative oil acids per mole of pentaerythritol and a catalytic amount of nuclear sulfonated styrene-divinyl copolymer cation exchange resin in the hydrogen cycle to esterify the pentaerythritol and to remove from 0.4 to 0.8 mole of water of etherification per mole of pentaerythritol, and thereafter heating the resulting partially esterified dipentaerythritol-containing pentaerythritol reaction product with a member selected from the group consisting of aliphatic dicarboxylic acids, aromatic dicarboxylic acids, cyclic dicarboxylic acids, and the anhydrides of said acids, said acid being present in an amount sufficient to react with substantially all of the hydroxyl groups of said partially esterified pentaerythritol reaction product, thereby forming an alkyd resin.

11. In the process of producing light colored alkyd resins, the steps comprising heating a mixture comprising pentaerythritol, 1 to 2 moles of siccative oil acids per mole of pentaerythritol and a catalytic amount of nuclear sulfonated styrene-divinyl copolymer cation exchange resin in the hydrogen cycle to esterify the pentaerythritol and to remove from 0.4 to 0.8 mole of water of etherification per mole of pentaerythritol and thereafter heating the resulting partially esterified dipentaerythritol-containing pentaerythritol reaction product with phthalic anhydride, said phthalic anhydride being present in an amount sufficient to react with substantially all of the hydroxyl groups of said partially esterified pentaerythritol reaction product, thereby forming an alkyd resin.

12. In the process of producing light colored alkyd resins, the steps comprising heating a mixture comprising pentaerythritol, 1 to 2 moles of soybean oil acids per mole of pentaerythritol and a catalytic amount of nuclear sulfonated styrene-divinyl copolymer cation exchange resin in the hydrogen cycle to esterify the pentaerythritol and to remove from 0.4 to 0.8 mole of water of etherification per mole of pentaerythritol and thereafter heating the resulting partially esterified dipentaerythritol-containing pentaerythritol reaction product with phthalic anhydride, said phthalic anhydride being present in an amount sufficient to react with substantially all of the hydroxyl groups of said partially esterified pentaerythritol reaction product, thereby forming an alkyd resin.

13. In the process of producing alkyd resins, the steps comprising partially esterifying pentaerythritol with 1 to 2 moles of fatty acid containing 6 to 18 carbon atoms to partially esterify the pentaerythritol, heating the partial ester of pentaerythritol with a catalytic amount of nuclear sulfonated styrene-divinyl copolymer cation exchange resin in the hydrogen cycle to remove from 0.4 to 0.8 mole of water of etherification per mole of pentaerythritol to form a partially esterified dipentaerythritol-containing pentaerythritol reaction product, and heating said pentaerythritol reaction product with a member selected from the group consisting of aliphatic dicarboxylic acids, aromatic dicarboxylic acids, cyclic dicarboxylic acids, and the anhydrides of said acids, said acid being present in an amount sufficient to react with substantially all of the hydroxyl groups of said partially esterified pentaerythritol reaction product thereby forming an alkyd resin.

14. In the process of producing alkyd resins, the steps comprising partially esterifying pentaerythritol with 1 to 2 moles of fatty acid containing siccative oil acids to partially esterify the pentaerythritol, heating the partial ester of pentaerythritol with a catalytic amount of nuclear sulfonated styrene-divinyl copolymer cation exchange resin in the hydrogen cycle to remove from 0.4 to 0.8 mole of water of etherification per mole of pentaerythritol to form a partially esterified, dipentaerythritol-containing pentaerythritol reaction product, and heating said partially esterified pentaerythritol reaction product with phthalic anhydride to form an alkyd resin.

15. The process of producing an esterified, dipentaerythritol-containing pentaerythritol reaction product which comprises partially esterifying pentaerythritol with a monocarboxylic acid and a dicarboxylic acid, said monocarboxylic acid containing 6 to 18 carbon atoms and said dicarboxylic acid being a member selected from the group consisting of aliphatic dicarboxylic acids, aromatic dicarboxylic acids, cyclic dicarboxylic acids, and the anhydrides of said acids, the total amount of said acids being at least one mole per mole of pentaerythritol less than the stoichiometric amount required for complete esterification of the pentaerythritol, and thereafter heating said partially esterified pentaerythritol with a catalytic amount of nuclear sulfonated styrene-divinyl benzene copolymer cation exchange resin in the hydrogen cycle to remove from 0.4 to 0.8 mole of water of etherification per mole of pentaerythritol thereby forming an esterified, dipentaerythritol-containing pentaerythritol reaction product.

16. The process of producing alkyd resins which comprises the steps of partially esterifying pentaerythritol with a monocarboxylic acid and a dicarboxylic acid, said monocarboxylic acid containing 6 to 18 carbon atoms and said dicarboxylic acid being a member selected from the group consisting of aliphatic dicarboxylic acids, aromatic dicarboxylic acids, cyclic dicarboxylic acids, and the anhydrides of said acids, the total amount of said acids being at least one mole per mole of pentaerythritol less than the stoichiometric amount required for complete esterification of the pentaerythritol, heating the partially esterified pentaerythritol with a catalytic amount of nuclear sulfonated styrene-divinyl benzene copolymer cation exchange resin in the hydrogen cycle to remove from 0.4 to 0.8 mole of water etherification per mole of pentaerythritol, and heating the resulting partially esterified dipentaerythritol-containing pentaerythritol reaction product with a member selected from the group consisting of aliphatic dicarboxylic acids, aromatic dicarboxylic acids, cyclic dicarboxylic acids, and the anhydrides of said acids, in an amount sufficient to react with substantially all of the hydroxyl groups of said partially esterified pentaerythritol reaction product thereby forming an alkyd resin.

References Cited in the file of this patent

UNITED STATES PATENTS

| | | |
|---|---|---|
| 2,182,397 | Eckey | Dec. 5, 1939 |
| 2,315,708 | Hovey et al. | Apr. 6, 1943 |
| 2,345,528 | Bradley | Mar. 28, 1944 |
| 2,409,332 | Woodruff | Oct. 15, 1946 |
| 2,627,508 | Lum | Feb. 3, 1953 |

OTHER REFERENCES

Martin Paint Manufacturing, vol. 15, April 1945, pages 89–92.

Rohm and Haas Co., "Amberlite IR-120 (H)-Analytical Grade," M-6-50 (revised September 1950), March 1951.